US012511613B2

United States Patent
Lupica Rinato et al.

(10) Patent No.: US 12,511,613 B2
(45) Date of Patent: Dec. 30, 2025

(54) LOGISTICS METHOD FOR A PRODUCT SUPPLY AND DISTRIBUTION CHAIN

(71) Applicant: CELERYA SRL, Bosconero (IT)

(72) Inventors: Claudio Lupica Rinato, Bosconero (IT); Dario Martinelli, Turin (IT); Marco Mazzini, Bosconero (IT)

(73) Assignee: Celerya SRL, Bosconero (IT)

( * ) Notice: Subject to any disclaimer, the term of this patent is extended or adjusted under 35 U.S.C. 154(b) by 532 days.

(21) Appl. No.: 17/630,371

(22) PCT Filed: Jul. 27, 2020

(86) PCT No.: PCT/IB2020/057077
§ 371 (c)(1),
(2) Date: Jan. 26, 2022

(87) PCT Pub. No.: WO2021/019428
PCT Pub. Date: Feb. 4, 2021

(65) Prior Publication Data
US 2022/0284381 A1   Sep. 8, 2022

(30) Foreign Application Priority Data

Jul. 29, 2019   (IT) .................. 102019000013191

(51) Int. Cl.
G06Q 10/087   (2023.01)
G06Q 30/018   (2023.01)
H04L 9/32     (2006.01)

(52) U.S. Cl.
CPC ....... *G06Q 10/087* (2013.01); *G06Q 30/0185* (2013.01); *H04L 9/3236* (2013.01)

(58) Field of Classification Search
CPC . G06Q 10/087; G06Q 30/0185; H04L 9/3236
(Continued)

(56) References Cited

U.S. PATENT DOCUMENTS 7,267,270 B2   9/2007  Hopwood et al.
8,534,544 B1 *  9/2013  Eker ..................... G06V 20/80
                                                235/375
(Continued)

FOREIGN PATENT DOCUMENTS

CN   101593264   * 12/2009
CN   101593264 A   12/2009
(Continued)

OTHER PUBLICATIONS

International Preliminary Report on Patentability dated Feb. 1, 2022, issued in PCT Application No. PCT/IB2020/057077, filed Jul. 27, 2020.
(Continued)

*Primary Examiner* — Luna Champagne
(74) *Attorney, Agent, or Firm* — Workman Nydegger

(57) ABSTRACT

A logistics method for a Product supply and distribution chain is described, the chain including a plurality of subjects in connection with one another through a centralized server for managing various activities for each subject in the chain and for using the data for the benefit of each subject in the chain, the method including the steps of: generating, through an electronic device of a Producer, a Digital Identity of a Product, the Digital Identity having an identifier and information about the Product; communicating, through said electronic device of the Producer, the association between the identifier and the Producer to a first database of a Certifying Body; associating the Digital Identity with the Product; recognizing, through an electronic device of a Customer, the identifier associated with the Product and transmitting the identifier to the centralized server; consulting, by the centralized server, the database of the Certifying Body and transmitting to the electronic device of the Cus-
(Continued)

tomer an electronic link pointing to the second database of the Producer.

11 Claims, 4 Drawing Sheets

(58) Field of Classification Search
USPC .......................................................... 705/28
See application file for complete search history.

(56) References Cited

U.S. PATENT DOCUMENTS

| | | | |
|---|---|---|---|
| 2005/0004838 A1* | 1/2005 | Perkowski | G06Q 30/0277 |
| | | | 705/14.73 |
| 2005/0177432 A1 | 8/2005 | Nevergole | |
| 2009/0146832 A1 | 6/2009 | Ebert et al. | |

FOREIGN PATENT DOCUMENTS

| | | | | | |
|---|---|---|---|---|---|
| CN | 102779284 | B | | 5/2015 | |
| CN | 107507012 | A | * | 12/2017 | |
| CN | 110288360 | B | * | 4/2022 | ......... G06K 17/0029 |
| WO | WO-2008131447 | A1 | * | 10/2008 | ............. H04L 9/083 |
| WO | WO-2019149908 | A1 | * | 8/2019 | ......... G06F 16/2379 |

OTHER PUBLICATIONS

International Search Report dated Oct. 21, 2020, issued in PCT Application No. PCT/IB2020/057077, filed Jul. 27, 2020.
Written Opinion dated Oct. 21, 2020, issued in PCT Application No. PCT/IB2020/057077, filed Jul. 27, 2020.

* cited by examiner

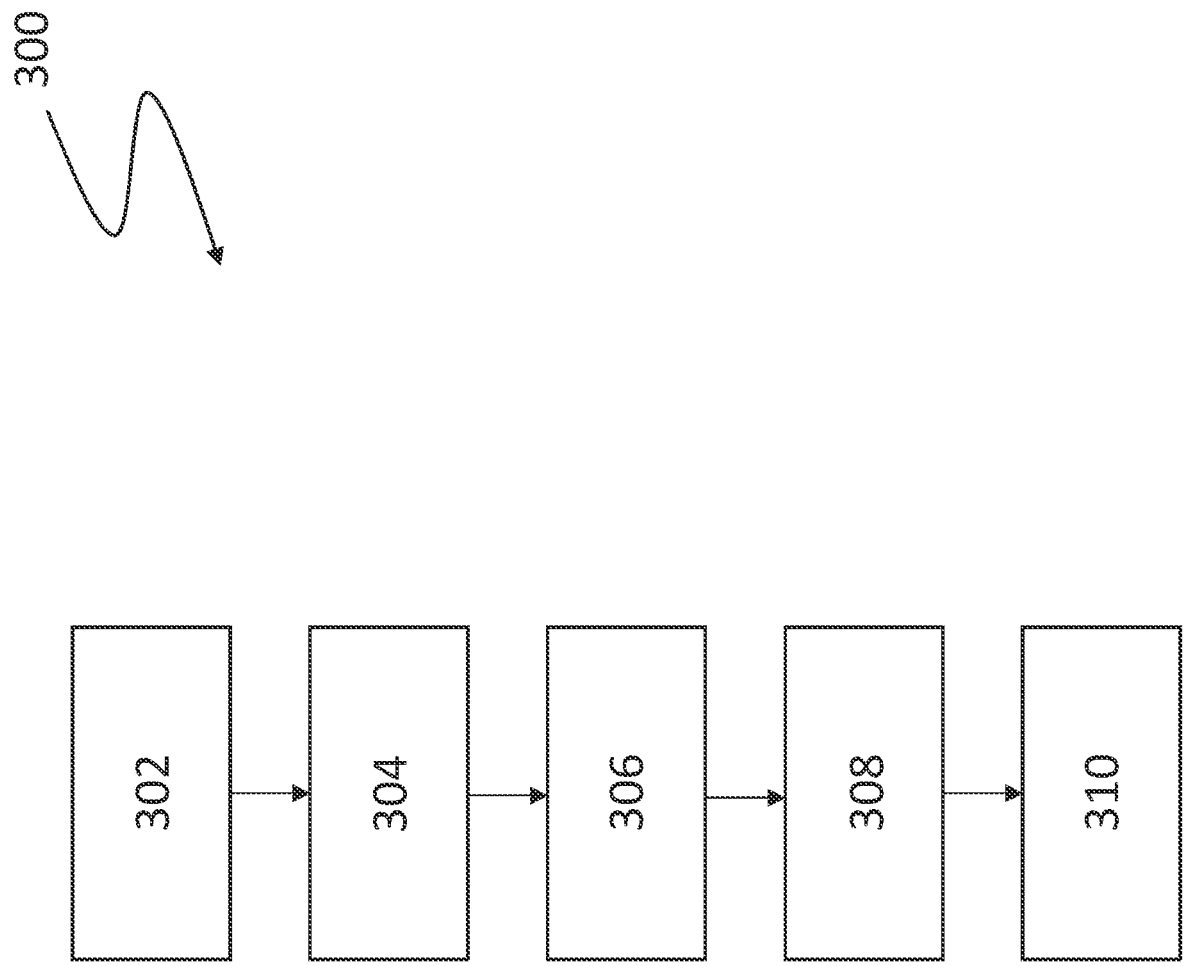

LOGISTICS METHOD FOR A PRODUCT SUPPLY AND DISTRIBUTION CHAIN

BACKGROUND OF THE INVENTION

1. The Field of the Invention

The present invention relates to a logistics method for a product supply and distribution chain.

More specifically, the present invention relates to logistic activities, e.g., storage, loading, distribution, shipping, as well as to inventory and stock management activities, e.g., order definition and product supply.

2. The Relevant Technology

The HACCP (Hazard Analysis and Critical Control Points) law, as set out in Art. 19 of EC Reg. 178/2002, prescribes that operators in the food industry who are responsible for retail sale or distribution activities, except for packaging and labelling operations, must adopt procedures for withdrawing from the market any products not fulfilling the food safety requirements. This kind of traceability, known as upstream traceability, involves the creation of a correlation register among product, supplier, lot and product's best-before date.

The state of the art is represented by patent application US 2005/177435 A1, which concerns a supply chain network involving distributors, customers, suppliers, logistics providers, carriers and financial institutions. This network is connected to a centralized server adapted to handle various management activities for each member of the supply chain, such as negotiating prices, terms and conditions, managing supply and demand, and maintaining transaction information. In the process, the server gathers significant amounts of relevant data and becomes a central repository for such information. Consequently, the server is in a unique position to utilize the data for the benefit of the members of the supply chain and others.

The state of the art is also represented by patent U.S. Pat. No. 7,267,270 B2, which concerns a method and a system for tracking goods loaded on a tracking carrier. The carrier and/or the goods have an RFID tag. The system comprises a data writing and reading device. The writing device is arranged to obtain information on the goods, write and read data corresponding to the carrier's or goods' RFID tag, for fulfilment of an order and to determine acceptance of the goods in dependence on an order's requirements.

The above-described state of the art gives the cue for solving a problem related to the necessity of making real-time information available to all members of the product supply and distribution chain.

A further problem lies in the need for eliminating all repetitive steps of entering the products' identification data along the supply and distribution chain.

SUMMARY OF THE INVENTION

It is one object of the present invention to solve the above-mentioned problems of the prior art by providing a method that makes it possible to optimize the product data entry steps along the supply and distribution chain.

Another object is to permit the execution of all those actions which are requested from legal entities dealing with food products.

A further object is to allow for simple and effective stock management and inventory generation.

The above and other objects and advantages of the invention, which will become clear in light of the following description, are achieved through a logistics method for a product supply and distribution chain as set out in claim 1. Some preferred embodiments and non-obvious variations of the present invention are set out in dependent claims.

It is understood that all the appended claims are an integral part of the present description.

It will become immediately apparent that what is described herein may be subject to innumerable variations and modifications (e.g., in shape, dimensions, arrangements and parts having equivalent functionality) without departing from the protection scope of the invention as set out in the appended claims.

The advantages of the invention are due to the fact that compliance with the law is attained by means of a fully digital approach, as opposed to a manual approach requiring complex and expensive labelling systems.

Compared with label use, data digitalization ensures immediate availability of the information, resulting in effective stock management and a simpler inventory process.

Moreover, the use of a centralized, global and distributed database makes it possible to considerably simplify the data acquisition phase, eliminating the risk that a phase might have to be repeated several times.

In case of non-compliance of a product, the body entrusted to carry out fiscal and sanitary verifications will come to know in real time the extent of the problem along the entire product supply and distribution chain, thus permitting a timely and exhaustive communication for safeguarding the public health and interest.

Furthermore, producers, wholesalers and retailers will be able to know in real time the situation of their stock and, should any lots or products have to be withdrawn, will be able to immediately notify their customers.

BRIEF DESCRIPTION OF THE DRAWINGS

The present invention will be described in detail below through some preferred embodiments thereof, which are only provided by way of non-limiting example, with reference to the annexed drawings, wherein:

FIG. 4 illustrates a flow chart of a phase of generating a second Digital Identity, associated with the Digital Identity, by a Customer in accordance with the method of the present invention.

DETAILED DESCRIPTION OF THE PREFERRED EMBODIMENTS

Figure 1:
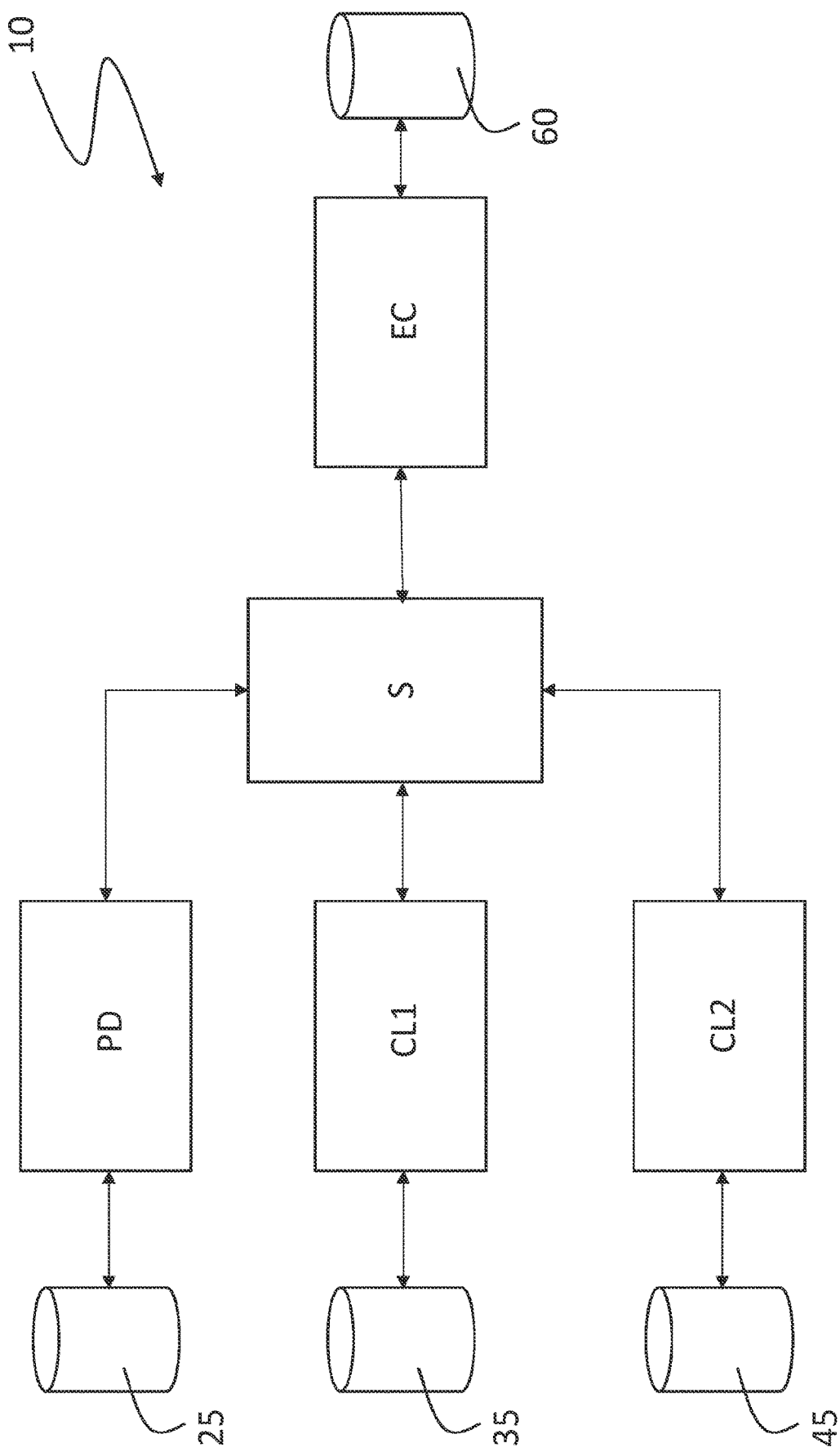
FIG. 1 illustrates a block diagram of a supply and distribution chain involved in the logistics method according to the present invention.

With reference to FIG. 1, there is shown a diagram 10 which is representative of the subjects of a product supply and distribution chain involved in the method according to the present invention.

Such subjects comprise at least:

a Certifying Body EC;

a Producer PD that produces a Product PRD;

a Customer CL1 that receives the Product PRD from the Producer PD.

The Customer CL1 may be, for example, one of distributors, customers, suppliers, logistics providers, carriers, financial and sanitary institutions.

With each one of these three subjects a respective proprietary database is associated: a first database 60 for the Certifying Body EC; a second database 25 for the Producer PD; a third database 35 for the Customer CL1.

At least one further Customer may then be envisaged, identified by reference CL2, with whom a respective database 45 is associated.

The subjects are in connection with one another through a centralized server S for managing various activities for each member of the chain and for using the data for the benefit of each member of the chain.

The connection between the centralized server S and electronic devices operable by the subjects EC, PD, CL1 and CL2 is established via a communication network, e.g., a telephone, wireless, wired, etc. network.

Figure 2:
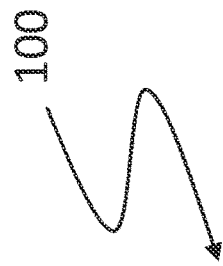
FIG. 2 illustrates a flow chart of a phase of generating a Digital Identity by a Producer in accordance with the method of the present invention.
Figure 2:
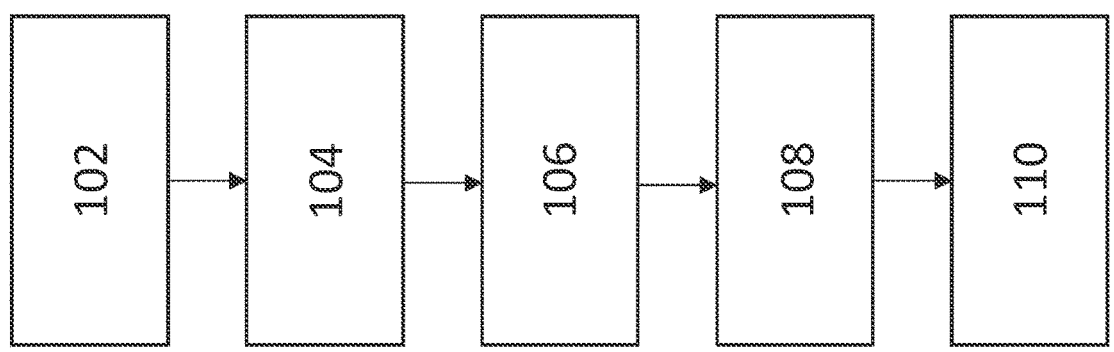

With reference to FIG. 2, the following will describe a flow chart 100 representative of a phase of creating a Digital Identity ID by a Producer PD.

The Digital Identity ID comprises an identifier IDEN and information about the Product PRD with which the Producer PD intends to associate a Digital Identity ID.

The identifier IDEN may comprise, for example, one or more of the following elements: a number; an alphanumeric string; a bar code; a two-dimensional code; a logo; an image; an RFID (Radio Frequency Identification) tag; an NFC (Near Field Communication) tag; an encrypted data block; a substance applicable to a Product PRD, e.g., a paint, capable of transmitting information, and the like.

The information about the Product PRD typically comprises public information IP and sensitive information IS.

The public information IP comprises all non-privileged information that the Producer PD wants to make available to the users of the Product PRD, whether for his own interest or because he is compelled to do so by fiscal, commercial or sanitary directives, or the like. Some examples of public information IP include the best-before date S-BY-D of the Product, its technical data sheet DS, its safety data sheet SDS, the sanitary compliance certificate HC, the tax compliance certificate TC, the bar code CODE and the production lot PL.

The sensitive information IS comprises any information that the Producer PD does not want to make available to the public, reserving it only for specific subjects in the logistic chain, in particular his Customers, and typically consists of commercial information about the Product PRD.

Some examples of sensitive information IS include, for example: purchase price, quantity of purchased products, data of the original invoice or receipt, selling price, quantity of sold products, shipping-related information.

At step 102 of the phase of generating a Digital Identity ID by a Producer PD, the latter assigns, through suitable software installed in an electronic device, e.g., a computer, a mobile phone, a tablet, etc., an identifier IDEN that identifies a Digital Identity ID being created.

At step 104, the identifier IDEN and the association between the Producer PD that created the Digital Identity ID and the identifier IDEN is communicated, through the centralized server S, to the Certifying Body EC, which provides for entering said association between the identifier IDEN and the Producer PD into a proprietary database 60. The Certifying Body EC thus owns a register in which the identifier IDEN is associated with the Producer PD that issued it.

At step 106, the Producer PD uploads at least the identifier IDEN and the public information IP into the second proprietary database 25.

If the Producer PD intends to enter any sensitive information IS into the Digital Identity ID, then the Producer PD may encrypt such sensitive information IS with a public key CPUB of the Customer CL1 to whom the Product PRD will be transferred.

The public key CPUB of the Customer CL1 may be generated, jointly with the corresponding private key CPRI, by the very Certifying Body EC, or it may be a public key CPUB already owned by the Customer CL1, which will have to be made known to the Producer PD for the encryption operation.

The generation of a public key and a private key, as well as the use thereof, is widely known in the art and is not addressed by the present invention.

At step 108, the Producer PD associates the identifier IDEN generated at step 102, with which the respective Digital Identity ID has been indissolubly associated, with the Product PRD.

Such association may be obtained either physically or virtually.

A physical association can be achieved by associating a label with the product PRD or with the package thereof, wherein the label comprises the identifier IDEN in printed form (e.g., a bar code, a two-dimensional code, a QR Code, a logo or an image) or the label comprises the identifier IDEN in electronic form, e.g. an RFID tag or an NFC (Near Field Communication) chip, in the memory means of which said identifier IDEN is stored.

A virtual association is effected by simply affixing the identifier IDEN to a fiscal document, a freight bill or another element that follows the Product PRD during its commercial transactions.

By way of example, for a lot of goods that comprises a considerable number of elements (e.g. a pallet comprising a thousand fruits), the association will have to be effected in a virtual manner because it would be expensive, and sometimes unfeasible, to physically associate a label to each fruit; vice versa, when larger or fewer objects (e.g. high-profile purses) are involved, it will be possible to physically apply a label containing the identifier IDEN of the Digital Identity associated with them.

At step 110, the Product PRD is transferred from the Producer PD to the Customer CL1, e.g. by means of a carrier.

Figure 3:
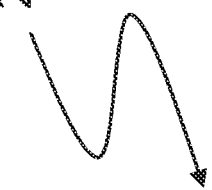
FIG. 3 illustrates a flow chart of a phase of using the information contained in the Digital Identity by a Customer in accordance with the method of the present invention.
Figure 3:
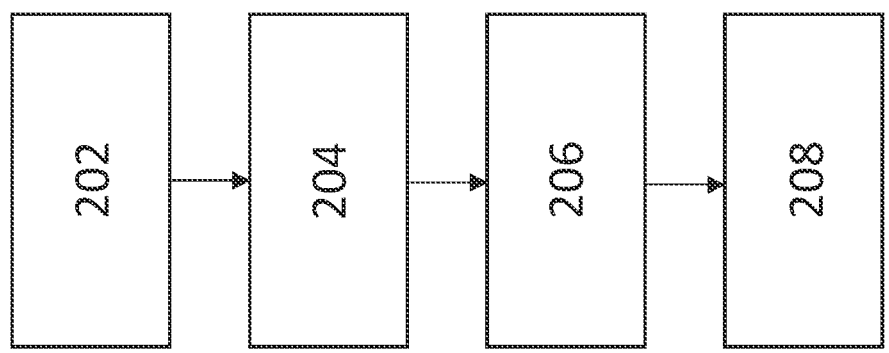

With reference to FIG. 3, the following will describe a flow chart 200 of a phase of using the information contained in the Digital Identity by a Customer.

At step 202, the Product PRD is received by the Customer CL1.

At step 204, the Customer CL1 recognizes, through his own electronic device, the identifier IDEN of the Product PRD. The electronic device may advantageously be an electronic device DE like, for example, a computer, a phone or a tablet equipped with a suitable application (app) which, after having electronically read the identifier IDEN, e.g., by means of a camera of the electronic device DE, will automatically connect, via the telecommunications network, to the centralized server S, and thence to the database 60 of the Certifying Body EC.

The recognition of a Product PRD may at any rate occur in different ways, in particular by means of: optical recognition devices, photo and video cameras embedded into electronic devices; dictation by an operator to an electronic device, followed by voice recognition and conversion into text; manual data entry by means of a keyboard of an electronic device by a producer/warehouse operator; wave-emitting devices integrated into the products, such as, for example, tags, NFC chips and induction circuits; electronic communication released by the supplier; electronic invoice.

At step 206, the centralized server S, by consulting the database 60 of the Certifying Body, identifies the identifier IDEN associated with the Digital Identity ID and provides the reader of the Customer CL1 with an electronic link pointing to the proprietary database 25 of the Producer PD, where said Digital Identity ID is stored.

At step 208, by accessing the database 25 of the Producer PD by means of said electronic link, the Customer CL1 can display on a screen of, or associated with, the electronic device DE not only the public information IP associated with the Product, but also any sensitive information IS that may have been entered by the Producer PD specifically for the Customer CL1. To this end, the Customer CL1 must enter, by using data entry means of the mobile device, e.g., a keyboard, the private key CPRI corresponding to the public key CPUB of the Customer CL1. Alternatively, the private key CPRI is already stored in memory means of the electronic device DE, and the application will only have to read such private key CPRI from the memory means of the electronic device DE in order to decrypt the sensitive information IS.

As will be further clarified below, the public information IP and the sensitive information IS may then, advantageously, be further processed by the Customer CL1.

If the Customer CL1 wants to transfer the Product PRD to another Customer, e.g., the Customer CL2, then the Customer CL1 may in turn create a Digital Identity ID2, which will be associated with both the Product PRD and the Digital Identity ID created by the Producer. The Digital Identity ID1 created by the Producer PD cannot, in fact, be either destroyed or modified.

With reference to FIG. 4, the following will describe a flow chart 300 representative of a phase of generating a Digital Identity by a Customer.

At step 302 of the phase of creating a Digital Identity ID2 by a Customer CL1, the latter assigns, through suitable software installed in an electronic device, e.g., a computer, a mobile phone, a tablet, etc., an identifier IDEN2 that identifies a Digital Identity ID2 being created.

At step 304, the identifier IDEN2 and the name of the Customer CL1 that created the Digital Identity ID2 associated with the identifier IDEN2 are communicated, through the centralized server S, to the Certifying Body EC, which will then enter into its own database 60 the association among the identifier IDEN2, the Customer CL1 and the Digital Identity ID1. Thus, the Certifying Body EC owns a register in which the identifier IDEN2 is associated with the Customer CL1 that issued it and with the Digital Identify ID1.

If the Customer CL1 intends to enter any sensitive information IS1 into the Digital Identity ID2, at step 306 the Customer CL1 may encrypt such sensitive information IS1 with a public key CPUB2 of the Customer CL2 to whom he will transfer the Product PRD.

The public key CPUB2 of the Customer CL2 may be generated, jointly with the corresponding private key CPRI2, by the very Certifying Body EC, or it may be a public key CPUB2 already owned by the Customer CL2, which will have to be made known to the Customer CL1 for the encryption operation.

At step 308, the Customer CL2 associates the Digital Identity ID just created with the Product PRD with which such Digital Identity ID1 and Digital Identity ID2 have been indissolubly associated.

As already mentioned with reference to FIG. 1, such association may be obtained either physically or virtually.

At step 310, the Product PRD is transferred from the Customer CL1 to the Customer CL2, e.g., by means of a carrier.

Both the public information IP and the sensitive information IS may be entered into the proprietary database 35 of the Customer CL1 or into the proprietary database 45 of the Customer CL2 for further data processing, e.g., through the use of respective management software.

In case the public information IP and/or the sensitive information IS cannot be directly used by the management software of the Customer CL1, it is possible to envisage the creation of a plugin which converts the public information IP and the sensitive information IS into a data format that can be understood and utilized by the respective management software of the Producer PD, the Customer CL1 and the Customer CL2.

For example, such further data processing may comprise one or more of the following phases:

a Product PRD monitoring phase for obtaining one or more of the following pieces of information: best-before date S-BY-D; technical data sheet DS; safety data sheet SDS; bar code CODE; production lot PL; tax compliance certificate TC; sanitary compliance certificate HC; purchase price; quantity and physical characteristics of the purchased products; data of the original invoice or receipt; selling price; quantity of sold products;

a correlation phase, as a function of a given time interval: list of simultaneously purchased products; best-before date S-BY-D, purchase invoice, production lot PL; best-before date S-BY-D, inventory data;

a phase of outputting a list of products associated with sanitary compliance criteria, as a function of results of a correlation with the best-before date S-BY-D;

a phase of outputting a list of products associated with special selling criteria, as a function of results of a correlation with the best-before date S-BY-D;

a control phase comprising: scanning the product by means of the input device, entering the best-before date, lot, to permit the visualization of the invoice connected with the purchased product. This phase makes it possible to achieve the goal of complying with the HACCP standard, i.e., binding the product to lot and invoice;

an inventory phase comprising: product scanning by means of the input device, entering the quantity of each individual product, best-before date, bar code and lot;

a stock alignment phase, wherein the quantity of products in stock is updated and any human-related problems, such as mistakes and damaged products, are eliminated;

a stock visualization phase comprising: detailed visualization of the products in stock with their best-before dates, lots and bar codes: this visualization phase may be useful for setting up selling strategies for products near their best-before date;

a further stock visualization phase, upon selection of a specific time interval within which all invoices are displayed along with the respective products, lots, best-before dates and bar codes; this visualization phase makes it possible to achieve the goal of complying with the HACCP standard, i.e., connecting the product to lot and invoice;

a document filing phase comprising: storing all the original documentation, such as invoices, receipts, HACCP compliance documents, requests from local health authorities and mandatory documents requested by designated international bodies;

an alert phase comprising: automatic monitoring of the best-before date of each product, automatic transmission of the notification of the list of products near their best-before date to predefined persons in charge.

The logistics method for a product supply and distribution chain of the present invention advantageously allows reaching the desired goals.

This method eliminates the need for manual registration activities to be carried out by each member in the product supply and distribution chain, replacing them with a single product recognition phase followed by a single filing phase for mutually associating at least the following fields into one record: product description, lot, invoice or receipt, bar code, best-before date, price.

The method according to the invention makes it possible to solve the following criticalities: traceability of each product in the invoices by simple recognition of the product; automatic creation of an alert about the best-before dates; automatic stock creation; simplification of the inventory process; connection among product, lot and invoice via the best-before date.

The supplier registration activity involves the entry of all fiscal data via an optical recognition device.

Thanks to the present invention, it is therefore possible to certify the unicity and compliance of each product in a supplier-consumer chain, with the twofold aim of spreading constantly updated information about a product while at the same time reserving any sensitive information about the Product only for those subjects in the chain to whom the Producer wants to communicate it.

Advantageously, the sensitive information is always controlled by the Producer (or by a Customer "adding" data to the sensitive information generated by the Producer), in that such sensitive information is encrypted with the public key of the addressee. Besides, the Producer knows exactly all the transactions of his products, and this brings full visibility of his Customers from the first to the last level of propagation along the chain. The transaction data can be used by the Producer for statistics, marketing, quality control, offers, and so on.

Therefore, the Certifying Body handles no sensitive information, since it only creates a connection between the Digital Identity of the Product and the subject that created the Digital Identity, pointing to the database of that subject.

Advantageously, the public information IP can be immediately updated by the Producer by simply updating it in its own database.

For example, should the data sheet DS of the Product PRD suddenly change, the updated information in the Producer's database will become immediately available to anybody reading the Digital Identity associated with the product PRD.

The Digital Identity created by the Producer cannot be modified for any reason, and any other Digital Identities subsequently created by the subjects in the chain will be associated with the Digital Identity created by the Producer. In this manner, the Product is constantly traced in all its movements, and anybody may interrogate the Digital Identity to verify the Product's compliance.

A further advantage of the method according to the present invention lies in the fact that, thanks to the Digital Identity, it is no longer necessary to repeatedly enter the product identification data along the supply or distribution chain, thus allowing the various operators in the chain to save time.

Finally, it is possible to identify all products that have been purchased simultaneously, so that any contamination can be traced back and the products can be withdrawn from the market, if necessary.

The above-described method can advantageously be implemented by means of a computer program product, in particular portions of software code, which can be installed into memory means of the server S and of the electronic devices of the Producer and of the Customers.

The logistics method for a product supply and distribution chain described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a logistics method for a product supply and distribution chain as described herein by way of example, but may be subject to many modifications, improvements or replacements of equivalent parts and elements without departing from the inventive idea, as clearly specified in the following claims.

The invention claimed is:

1. A logistics method for a Product supply and distribution chain, the Product supply and distribution chain including a plurality of subjects comprising at least one Certifying Body associated with a first database, a Producer associated with a second database, that produces a Product, and a first Customer, the plurality of subjects being in connection with one another through a centralized server for managing various activities for each subject in the Product supply and distribution chain, the method comprising:

generating, through a first electronic device of the Producer, a first Digital Identity of a Product, the first Digital Identity comprising a first identifier and information about the Product;

transmitting through the first electronic device of the Producer to the Certifying Body an association between the first identifier and the Producer, the Certifying Body saving the association in the first database;

indissolubly associating, by the Producer, the first Digital Identity with the Product in the second database;

recognizing, through a second electronic device of the first Customer, the first identifier associated with the Product and transmitting the first identifier to the centralized server;

consulting, by the centralized server, the first database of the Certifying Body and transmitting to the second electronic device of the first Customer an electronic link pointing to the second database of the Producer, where the first Digital Identity is stored;

accessing, by the second electronic device of the first Customer, the second database of the Producer by means of the electronic link and displaying the information about the Product on a screen associated with the second electronic device of the first Customer;

generating, by the first Customer for use transmitting the Product to a second Customer, a second Digital Identity that is associated with both the Producer and the first Digital identity, the second Digital Identity comprising a second identifier and a name of the first Customer;

transmitting through the second electronic device of the first Customer and to the first database of the Certifying Body a second association between the second identifier, the first Digital Identity, and the first Customer, the Certifying Body saving the second association; and associating, by the Certifying Body, the second association with the first identifier, wherein sensitive information within the second Digital Identity is encrypted with a public key of the second Customer.

2. The method according to claim 1, wherein associating the first Digital Identity with the Product comprises physically associating a label comprising the first identifier with the Product, or with a package thereof.

3. The method according to claim 2, wherein the label is either in printed form or in electronic form in a memory means of which the first identifier is stored.

4. The method according to claim 1, wherein associating the first Digital Identity with the Product comprises affixing the first identifier to a fiscal document, a freight bill or another document that follows the product during its commercial transactions.

5. The method according to claim 1, wherein the information about the Product comprises public information available to all the subjects in the chain and sensitive information only available to one or more specific subjects in the chain, the sensitive information being encrypted by the Producer with a public key of the first Customer for whom the information is intended.

6. The method according to claim 5, wherein the sensitive information comprises information reserved for particular subjects in the chain, and comprises one or more of: purchase price, quantity of purchased products, data of an original invoice or receipt, selling price, quantity of sold products, or shipping-related information.

7. The method according to claim 5, wherein the first Customer displays the sensitive information on the screen associated with the second electronic device of the first Customer by using a private key corresponding to the public key.

8. The method according to claim 5, wherein the public information comprises non-privileged information made available to users of the Product, and comprises one or more of: best-before date; technical data sheet; safety data sheet; sanitary compliance certificate; tax compliance certificate; bar code; or production lot.

9. The method according to claim 1, wherein the information is used by a respective management program of one of the plurality of subjects for further data processing, the further data processing comprising one or more of:

a Product monitoring phase for obtaining one or more of: best-before date; technical data sheet; safety data sheet; bar code; production lot; tax compliance certificate; sanitary compliance certificate; purchase price, quantity and physical characteristics of the purchased products, data of an original invoice or receipt, selling price, and quantity of sold products;

a correlation phase, as a function of a given time interval: list of simultaneously purchased products; best-before date, purchase invoice, production lot, best-before date, and inventory data;

a phase of outputting a list of products associated with sanitary compliance criteria, as a function of results of a correlation with a best-before date;

a phase of outputting a list of products associated with special selling criteria, as a function of results of a correlation with a best-before date;

a control phase comprising: scanning the product by means of an input device, entering a best-before date, lot, to permit visualization of an invoice connected with the product that is purchased;

an inventory phase comprising: product scanning by means of a input device, entering a quantity of each individual product, best-before date, bar code and lot;

a stock alignment phase, wherein a quantity of products in stock is updated and any human-related problems, such as mistakes and damaged products, are eliminated;

a stock visualization phase comprising: detailed visualization of products in stock with their best-before dates, lots and bar codes, wherein the stock visualization phase is used for setting up selling strategies for products near their best-before date;

a further stock visualization phase, upon selection of a specific time interval within which all invoices are displayed along with respective products, lots, best-before dates and bar codes;

a document filing phase comprising: storing all original documentation, such as invoices, receipts, HACCP compliance documents, requests from local health authorities and mandatory documents requested by designated international bodies; or an alert phase comprising: automatic monitoring of best-before date of each product, automatic transmission of a notification of list of products near their best-before date to predefined persons in charge.

10. The method according to claim 1, wherein the first identifier comprises one or more of: a number; an alphanumeric string; a bar code; a two-dimensional code; a logo; an image; an RFID tag; an NFC tag; an encrypted data block; or a substance applicable to the Product.

11. A computer program product that can be loaded into memory means of a server and electronic devices of a Producer and a first Customer, comprising portions of software code adapted to implement the method according to claim 1.

* * * * *